J. W. JEPSON.
ELECTRICAL SYSTEM OF DISTRIBUTION.
APPLICATION FILED JAN. 21, 1914.

1,255,535.

Patented Feb. 5, 1918.

WITNESSES

INVENTOR
John W. Jepson
BY
Kenyon & Kenyon
ATTORNEYS

J. W. JEPSON.
ELECTRICAL SYSTEM OF DISTRIBUTION.
APPLICATION FILED JAN. 21, 1914.

1,255,535.

Patented Feb. 5, 1918.
2 SHEETS—SHEET 2.

WITNESSES

INVENTOR
John W. Jepson
BY
Kenyon & Kenyon
ATTORNEYS

UNITED STATES PATENT OFFICE.

JOHN W. JEPSON, OF DEPEW, NEW YORK, ASSIGNOR TO GOULD COUPLER COMPANY, A CORPORATION OF NEW YORK.

ELECTRICAL SYSTEM OF DISTRIBUTION.

1,255,535.       Specification of Letters Patent.       Patented Feb. 5, 1918.

Application filed January 21, 1914. Serial No. 813,415.

*To all whom it may concern:*

Be it known that I, JOHN W. JEPSON, a citizen of the United States, and a resident of Depew, Erie county, New York, have invented certain new and useful Improvements in Electrical Systems of Distribution, of which the following is a specification.

My invention relates to electrical systems of distribution and more particularly to car lighting systems in which a generator is driven at a variable speed from the car axle and adapted to charge a storage battery and supply a lamp or work circuit.

The main object of the invention is to provide an arrangement in which when the battery becomes substantially charged the charging current is more quickly cut down and eliminated. Further objects, features and advantages will more clearly appear from the detailed description given below taken in connection with the accompanying drawings which form a part of this specification.

Figure 1:
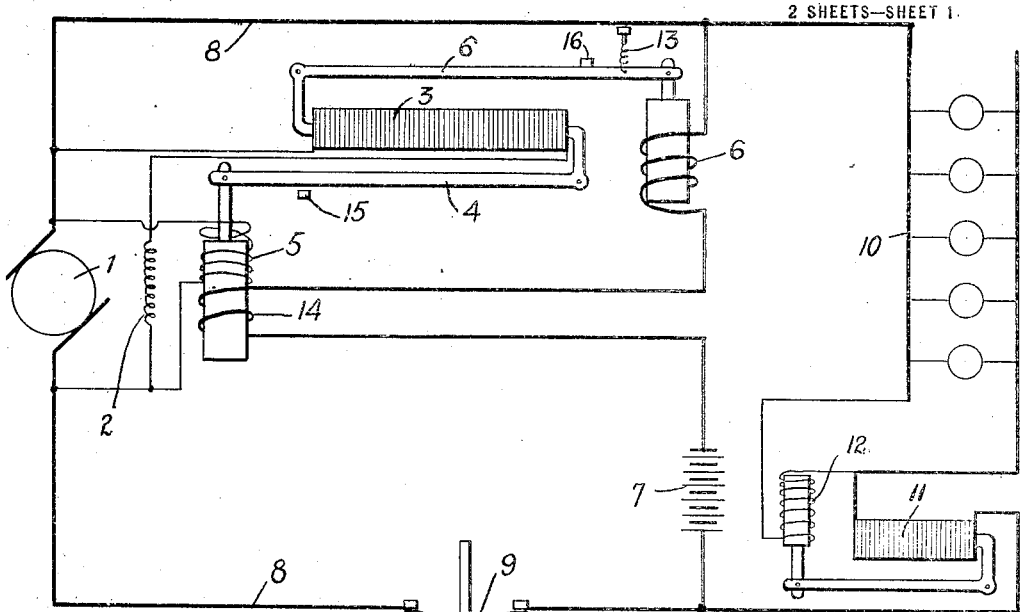

In the drawings, Figure 1 is a diagram illustrating a system embodying my improvements in one form.

Figure 2:
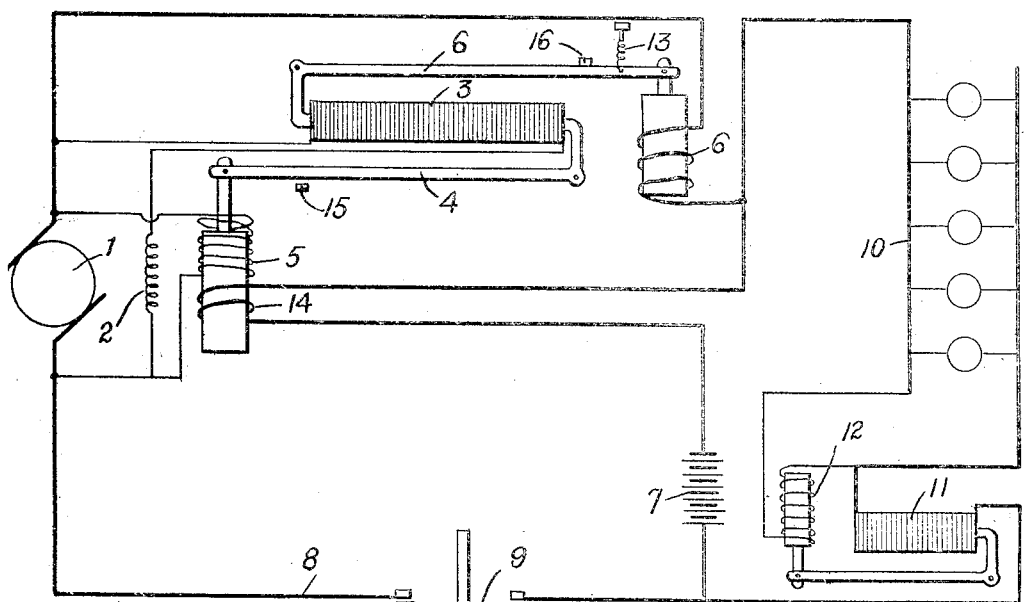
Figure 3:
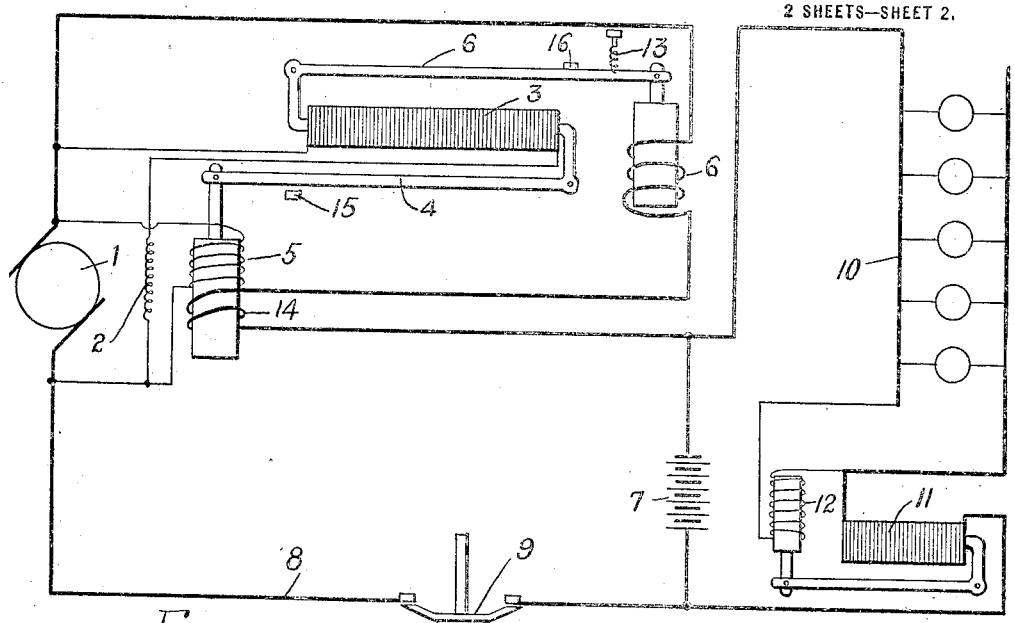
Figure 4:
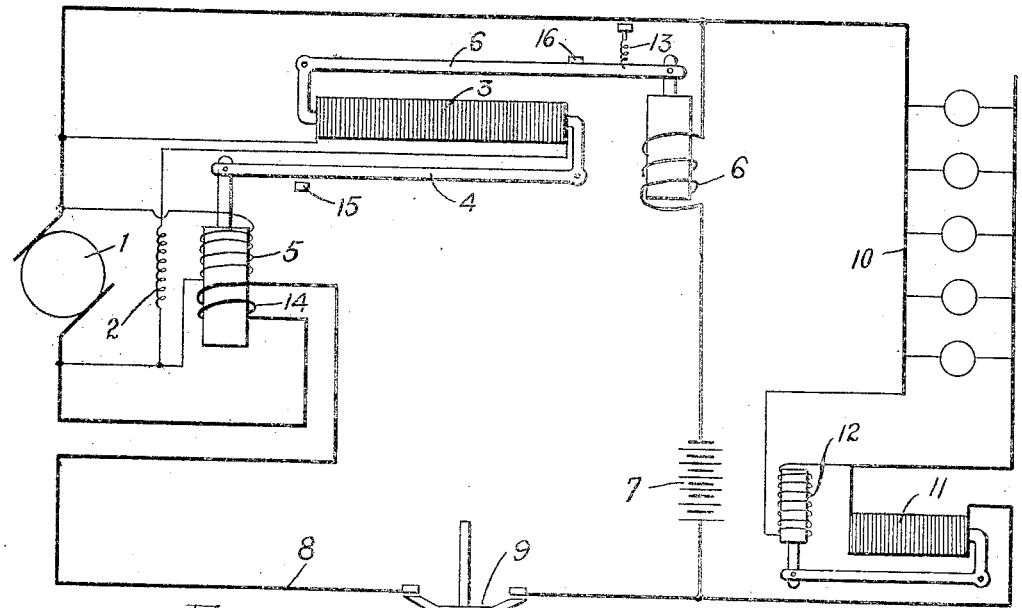

Figs. 2, 3 and 4 are diagrams illustrating modifications.

Referring to Fig. 1, 1 represents a main generator, which may be driven at a variable speed from the car axle. 2 represents its shunt field having in series therewith a carbon pile variable resistance 3 operated upon at one end by lever 4 controlled by a voltage solenoid having a voltage coil 5 connected in shunt across the generator. 6 represents a lever operating upon the other end of the pile controlled by a current solenoid having a current coil 6 arranged in series with the battery 7 connected across the generator mains 8. 9 represents an automatic switch of any suitable kind adapted to connect the storage battery 7 and work circuit or lamp circuit 10 to the generator when the generator has attained sufficient speed and voltage. 11 represents a carbon pile resistance in series with the lamp circuit controlled by a voltage solenoid 12 for the purpose of maintaining the voltage across the lamp circuit substantially constant, in a well known manner.

The operation of the parts so far described is as follows: Upon the generator obtaining sufficient speed the main switch 9 is closed and the generator furnishes current to the work circuit 10. If the battery be in a discharged condition it will also feed current to the battery. If the battery current tends to exceed a certain predetermined value which is set as the desirable charging current the coil 6 becomes sufficiently energized to overcome the opposing spring 13 and moves the lever 6 to release pressure on the pile 3 and thus increase the resistance in series with the field 2 so as to prevent the voltage of the generator increasing above a value sufficient to maintain a substantially constant charging current to the battery. This operation continues until the battery has become substantially charged when the increase in voltage across the battery and generator will so increase the strength of the coil 5 that it will have sufficient strength to raise the core of the voltage solenoid and thus tend to further decrease the resistance of the pile 3 in series with the field 2 so as to prevent the voltage of the generator exceeding a predetermined voltage set as determining the voltage of the battery when it is charged to the desired amount. The battery continues to charge slightly but as the voltage of the generator is limited by the voltage solenoid the charging current will rapidly taper off as the battery counter electromotive force continues to rise slightly until the charging current is reduced to substantially nothing. If at any time the generator speed be decreased below the critical value so that the main switch 9 is opened the battery will supply energy to the lamp circuit 10 in the usual manner.

In order that any substantially further increase in battery counter electromotive force may be prevented after the voltage solenoid starts to control the pile, I provide an additional coil 14 upon the voltage solenoid, which coil is connected in series in the battery circuit and is wound to oppose the coil 5. The coil 14 is of relatively few ampere turns as compared with the coil 5. When the coil 5 becomes of sufficient strength to raise the core of the voltage solenoid and thus limit the voltage of the generator it will be seen that this acts to almost immediately cause a decrease in the battery charging current which consequently weakens the counter effect of the coil 14. This permits the coil 5 to raise the core of the voltage solenoid with a much less voltage to keep the regulating apparatus in equilibrium, and consequently causes a slight decrease in generator voltage. This will necessarily be followed by a still further decrease in the battery charging current, which still further decreases the counter effect of the coil 14 and in a like manner reacts upon the voltage solenoid to permit the coil 5 to raise the core of the voltage solenoid with a still less generator voltage, which in turn again reacts to cause a further decrease in charging current, and so on. It will thus be seen that by placing the current coil on the voltage solenoid opposing the voltage coil the charging current to the battery is more rapidly decreased after the battery has become charged and the voltage of the generator slightly decreased, to accomplish this and thus more greatly decreasing the battery current which generally continues to flow through the battery sometimes causing gasing of the cells after the battery has become charged, or other disadvantageous results.

Stops 15 and 16 act to limit the movements of the levers 4 and 6 respectively.

The modifications shown in Figs. 2, 3 and 4 operate in substantially the same way with the exception that in Fig. 2 the current coil 6 is serially connected with the generator to be in series with both the battery and work circuit, and in Fig. 3 both of the coils 6 and 14 are serially connected with the generator to be in series with both the battery and work circuit, while in Fig. 4 the coil 6 is serially connected with the generator to be in series only with the battery, but the coil 14 is serially connected with the generator to be in series with both the battery and work circuit.

Although I have described my improvements in great detail and with respect to certain specific embodiments of the invention, I do not desire to be limited to such details except as clearly pointed out in the appended claims, since many changes and modifications may well be made without departing from the spirit and scope of my invention in its broader aspects.

Having fully and clearly described my improvements, what I claim as new and desire to secure by Letters Patent, is:

1. In an electrical system of distribution a generator driven at a variable speed, a work circuit and storage battery arranged to be fed thereby, a carbon pile for regulating the voltage of the generator, and two solenoids with independently movable cores controlling the resistance of said pile, one solenoid having a coil serially connected with the generator for regulating it for constant current, the other solenoid having a coil responsive to voltage changes of the system for limiting the voltage of the generator, said last mentioned solenoid also having a coil serially connected with the generator opposing said voltage coil and normally of relatively few ampere turns, whereby when the voltage of the battery reaches a value sufficient to cause the voltage solenoid to operate to control the pile the current from the generator is more rapidly decreased.

2. In an electrical system of distribution, a generator driven at variable speed, a work circuit and storage battery connected to be fed thereby, a carbon pile for regulating the voltage of the generator, a current solenoid controlling the action of the pile responsive to current variations, and a solenoid having a voltage coil controlling the action of the pile to limit the voltage of the generator, said voltage solenoid having substantially no effect on the pile until the voltage of the generator reaches a predetermined value, said current solenoid being adapted to control the pile in the meantime and said voltage solenoid having a current coil opposing the voltage coil whereby when the voltage of the battery rises to a value sufficient to cause the voltage solenoid to control the pile the current in the current solenoid is more rapidly decreased.

3. In an electrical system of distribution a generator driven at variable speed, a storage battery connected to be fed thereby, a carbon pile for regulating the voltage of the generator, a current solenoid controlling the action of the pile responsive to current variations, and a solenoid having a voltage coil controlling the action of the pile to limit the voltage of the generator, said voltage solenoid having substantially no effect on the pile until the voltage of the generator reaches a predetermined value, said current solenoid being adapted to control the pile in the meantime and said voltage solenoid having a current coil opposing the voltage coil whereby when the voltage of the battery rises to a value sufficient to cause the voltage solenoid to control the pile the current from the generator is more rapidly decreased.

4. In an electrical system of distribution, a generator driven at variable speed, a storage battery connected to be fed thereby, a carbon pile for regulating the voltage of the generator, a current solenoid controlling the action of the pile responsive to current variations, and a solenoid having a voltage coil controlling the action of the pile to limit the voltage of the generator, said voltage solenoid having substantially no effect on the pile until the voltage of the generator reaches a predetermined value, said current solenoid being adapted to control the pile in the meantime and said voltage solenoid having a current coil opposing the voltage coil and normally of relatively few ampere turns.

5. In an electrical system of distribution, a generator driven at variable speed, a storage battery connected to be fed thereby, a carbon pile for regulating the voltage of the generator, a current solenoid controlling the action of the pile responsive to current variations, and a solenoid having a voltage coil controlling the action of the pile to limit the voltage of the generator, said solenoids acting mechanically independently in the control of the pile, said voltage solenoid having substantially no effect on the pile until the voltage of the generator reaches a predetermined value, said current solenoid being adapted to control the pile in the meantime and said voltage solenoid having a current coil opposing the voltage coil and normally of relatively few ampere turns.

6. In an electrical system of distribution, a generator driven at variable speed, a storage battery connected to be fed thereby, a carbon pile for regulating the voltage of the generator, a current solenoid controlling the action of the pile responsive to current variations, and a solenoid having a voltage coil controlling the action of the pile to limit the voltage of the generator, said solenoids acting mechanically independently directly upon the pile, said voltage solenoid having substantially no effect on the pile until the voltage of the generator reaches a predetermined value, said current solenoid being adapted to control the pile in the meantime and said voltage solenoid having a current coil opposing the voltage coil whereby when the voltage of the battery rises to a value sufficient to cause the voltage solenoid to control the pile the current from the generator is more rapidly decreased.

7. In an electrical system of distribution, a generator driven at a variable speed, a storage battery arranged to be fed thereby, a carbon pile for regulating the voltage of the generator, and two solenoids controlling the resistance of said pile, one solenoid having a coil serially connected with the generator for regulating it for constant current, the other solenoid having a coil responsive to voltage changes of the system for limiting the voltage of the generator, said last mentioned solenoid also having a coil serially connected with the generator opposing said voltage coil and normally of relatively few ampere turns.

8. In an electrical system of distribution, a generator driven at variable speed, a work circuit and storage battery connected to be fed thereby, a carbon pile for regulating the voltage of the generator, a current solenoid controlling the action of the pile responsive to current variations, and a solenoid having a voltage coil controlling the action of the pile to limit the voltage of the generator, said voltage solenoid having substantially no effect on the pile until the voltage of the generator reaches a predetermined value, said current solenoid being adapted to control the pile in the meantime and said voltage solenoid having a coil opposing the voltage coil and responsive to battery current variations whereby when the voltage of the battery rises to a value sufficient to cause the voltage solenoid to control the pile the current in the current solenoid is more rapidly decreased.

9. In an electrical system of distribution, a generator driven at variable speed, a storage battery connected to be fed thereby, a carbon pile for regulating the voltage of the generator, a current solenoid controlling the action of the pile responsive to current variations, and a solenoid controlling the action of the pile to limit the voltage of the generator, said voltage solenoid having substantially no effect on the pile until the voltage of the generator reaches a predetermined value, said current solenoid being adapted to control the pile in the meantime and said voltage solenoid having a coil opposing the voltage coil and responsive to battery current variations, whereby when the voltage of the battery rises to a value sufficient to cause the voltage solenoid to control the pile the current to the battery is more rapidly decreased.

10. In an electrical system of distribution the combination of a generator, a storage battery connected to be charged thereby, a coil serially connected between the generator and battery, means whereby said coil controls the output of the generator to limit the battery current, a voltage coil, means whereby, when said battery reaches a certain state of charge, said voltage coil causes the generator to deliver less current to the battery, and means responsive to battery current changes for increasing the effect produced on the generator by said voltage coil.

11. In an electrical system of distribution the combination of a generator, a storage battery connected to be charged thereby, a coil serially connected between the generator and battery regulating the output of the generator, a voltage coil acting to limit the voltage of the generator, and a coil acting to increase the effect produced by said voltage coil in limiting the generator voltage when the current through the battery decreases.

12. In an electrical system of distribution the combination of a generator, a storage battery connected to be charged thereby, means including a coil, serially connected between the generator and battery for regulating the current output of the generator, means for causing the voltage of the generator to be limited as the battery becomes charged, and means responsive to a decrease in current for causing said last mentioned means to limit the voltage of the generator to a lower value.

13. In an electrical system of distribution the combination of a generator, a storage battery connected to be charged thereby, and means for regulating the generator comprehending a coil serially connected between the generator and battery acting to limit the generator current, a voltage coil acting to limit the voltage of the generator and a coil responsive to changes in the battery current and acting to cause the generator voltage to decrease as the battery current decreases.

14. In an electrical system of distribution the combination of a generator, a storage battery connected to be charged thereby, a work circuit connected to said battery and means for regulating the generator comprising two magnets, one controlled by a coil serially connected between the generator and battery to limit the generator current output, and the other controlled by a voltage coil to limit the voltage of the generator to prevent overcharging of the battery, and a coil responsive to current changes acting to reduce the voltage of the generator as the battery current decreases.

15. In an electrical system of distribution of the class wherein a variable speed generator charges a storage battery and when the battery becomes sufficiently charged a voltage coil becomes effective to regulate the generator for constant potential, the combination with said voltage coil of a coil traversed by current flowing to the battery which is acted upon by decreasing battery current to reduce the potential maintained constant by the voltage coil.

16. An electrical system of distribution wherein a generator charges a storage battery until the battery reaches some desired state of charge whereupon a voltage coil becomes effective to regulate the generator for constant potential, characterized by the fact that there is combined with said voltage coil a coil traversed by current flowing to the battery which is acted upon by decreasing battery current to reduce the potential maintained constant by the voltage coil.

In testimony whereof, I have signed my name to this specification, in the presence of two subscribing witnesses.

JOHN W. JEPSON.

Witnesses:
GORHAM CROSBY,
EDWIN SEGER.

Copies of this patent may be obtained for five cents each, by addressing the "Commissioner of Patents, Washington, D. C."